UNITED STATES PATENT OFFICE.

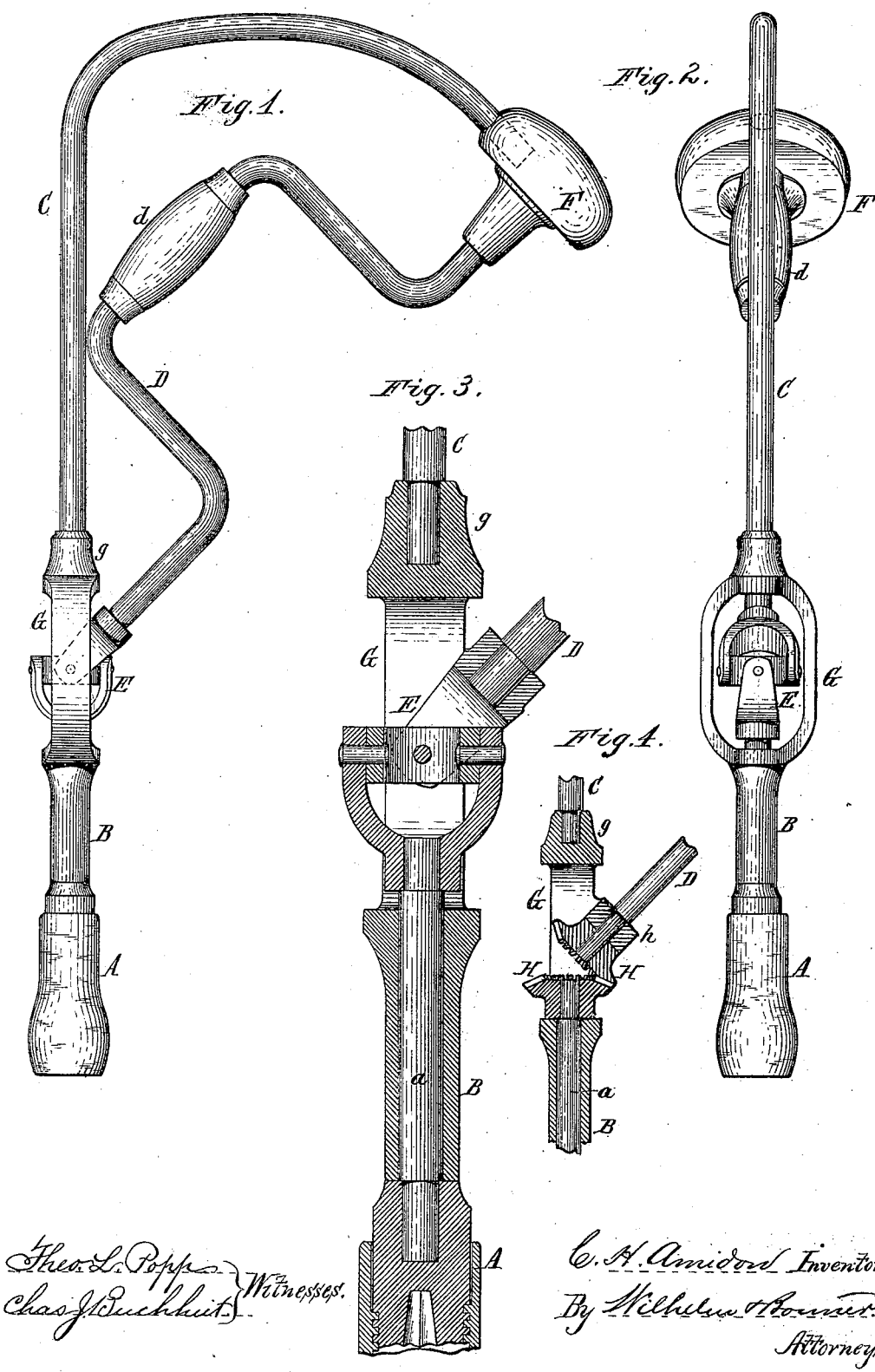

CHARLES H. AMIDON, OF BUFFALO, NEW YORK.

BIT-BRACE.

SPECIFICATION forming part of Letters Patent No. 298,542, dated May 13, 1884.

Application filed October 18, 1883. (No model.)

*To all whom it may concern:*

Be it known that I, CHARLES H. AMIDON, of the city of Buffalo, in the county of Erie and State of New York, have invented new and useful Improvements in Bit-Braces, of which the following is a specification.

This invention relates to a bit-brace in which the bit-socket is arranged at an angle to the axis of the crank for the purpose of enabling the bit-brace to be used for drilling holes in close proximity to a wall or other obstruction which does not permit the crank to be turned when its axis is in line with the bit-socket.

The object of my invention is to construct a bit-brace of this character in which the necessary pressure can be applied to the bit, and in which the bit can be properly guided or steadied in drilling.

My invention consists of the improvements in the construction of the bit-brace which will be hereinafter fully set forth, and pointed out in the claims.

In the accompanying drawings, Figures 1 and 2 are elevations of my improved bit-brace at right angles to each other. Fig. 3 is a fragmentary sectional elevation on an enlarged scale illustrating the means whereby the crank is connected with the bit-socket. Fig. 4 is a similar view showing a modified construction of this device.

Like letters of reference refer to like parts in the several figures.

A represents the bit-socket, which may be of any ordinary or suitable construction, and which is secured to the end of a shank, $a$, which turns in a bearing, B.

C is an angular or elbow-shaped frame, which is attached at one end to the bearing B, and serves to support the movable parts of the brace.

D is the crank, provided with a handle, $d$, in the usual manner. The crank D is composed of a bent rod, one end of which is connected with the upper end of the shank $a$ by a universal joint, E, whereby the rotative movement of the crank is transmitted to the shank $a$ and the bit-socket A. The opposite end of the crank D turns in a head, F, which is rigidly secured to the frame C.

The socket B is constructed with an open extension, G, which incloses the universal joint E, and is provided at its upper end with a socket, $g$, in which the lower end of the frame C is rigidly secured.

The frame C is preferably composed of a bent rod or bar having the requisite degree of rigidity to firmly connect the head F with the socket B and extension G.

A pair of bevel-wheels, H H, may be substituted for the universal joint E, as represented in Fig. 4, for connecting the crank D with the shank $a$, if desired; but in this case the end of the crank D adjacent to the bevel-wheels H is supported in a bearing, $h$, attached to the extension G, which bearing is not required when a universal joint is employed.

The bit-socket A can be placed closely against the base-board of a wall or other obstruction or projecting part near which a hole is to be bored, and the crank D can be freely rotated when the bit-socket is so placed, thereby permitting the boring of holes by the continuous rotation of the bit in places where ratchet-braces are now used.

By holding the bearing B with one hand and bearing down on the frame C and head F, the necessary pressure is applied to the bit, and the bit is guided and steadied in its work, the other hand being used to rotate the crank D.

I claim as my invention—

1. The combination, with a bit-socket and a crank having its axis arranged at an angle to the bit-socket, of mechanism whereby the rotative motion of the crank is transmitted to the bit-socket, and an angular or elbow-shaped frame or support, whereby the bit-socket and crank are retained in their relative position, substantially as set forth.

2. The combination, with a bit-socket and a crank, D, having its axis arranged at an angle to the bit-socket, of a frame, C, having at one end a head, F, in which one end of the crank is supported, and at its opposite end a bearing, B, in which the shank of the bit-socket is supported, and mechanism whereby the crank is connected with the shank of the bit-socket, substantially as set forth.

3. The combination, with the bit-socket A and shank $a$, of the crank D, the frame C, having a head, F, bearing B, and extension G, and a universal joint, E, connecting the crank D with the shank $a$, substantially as set forth.

Witness my hand this 3d day of October, 1883.

CHARLES H. AMIDON.

Witnesses:
   JNO. J. BONNER,
   CARL F. GEYER.